2 Sheets—Sheet 1.
J. G. DUNHAM.
Mower.
No. 2,648. Reissued June 11, 1867.
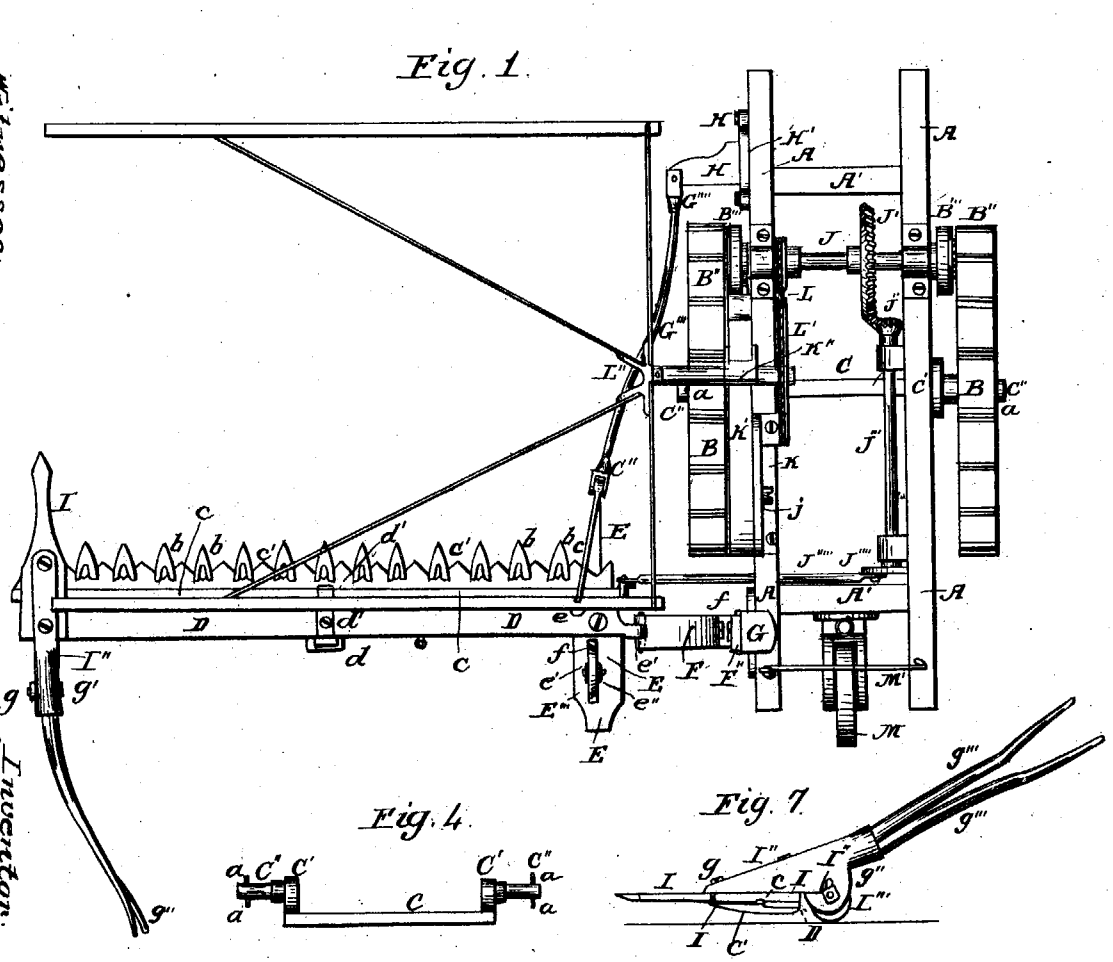
Witnesses:
H. York Hall
Geo. Dawson
Inventor:
John G. Dunham
By His Attorney
Thos. H. Dodge
N. PETERS, Photo-Lithographer, Washington, D. C.

J. G. DUNHAM.
Mower.
No. 2,648. Reissued June 11, 1867.
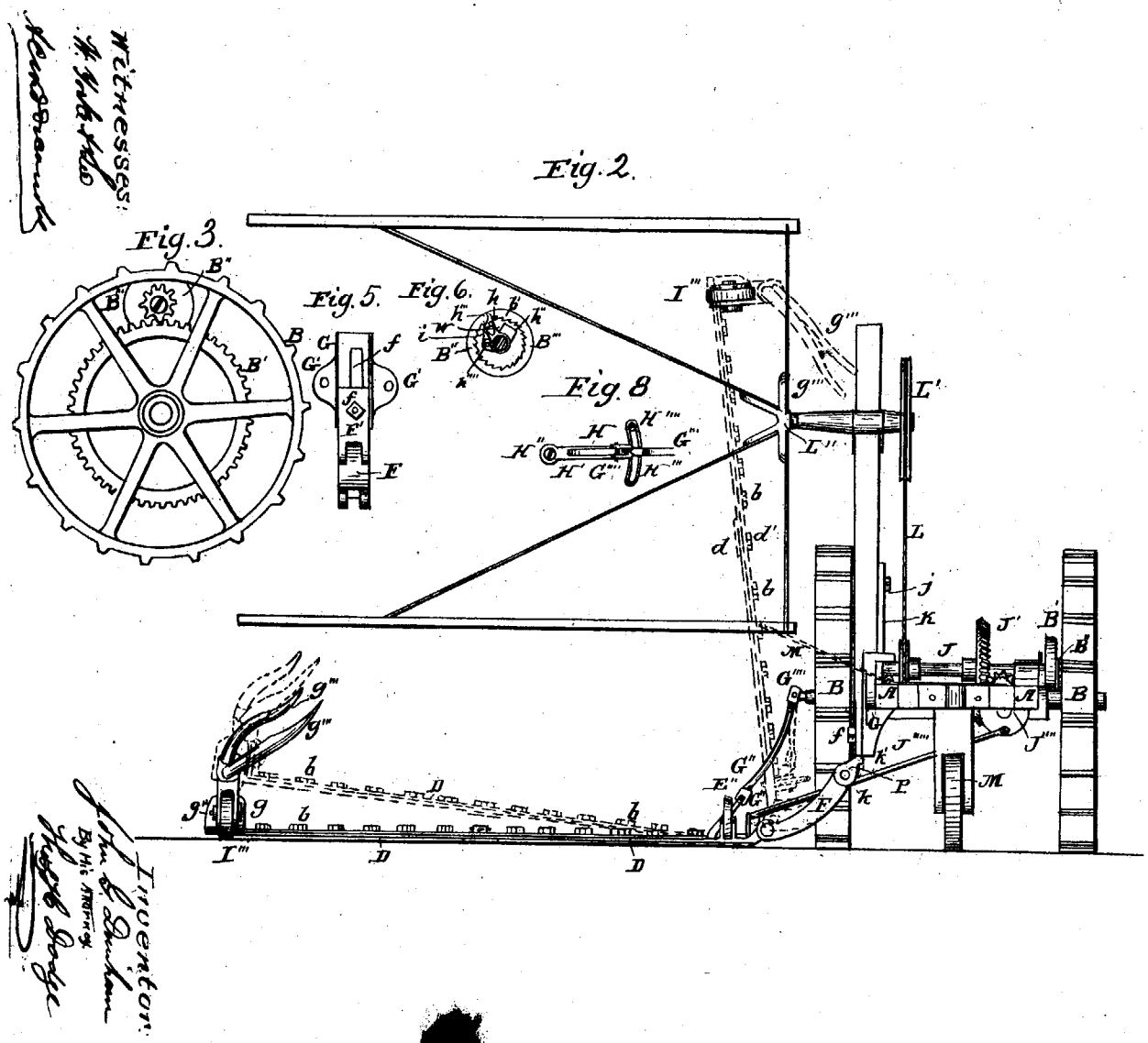
N. PETERS. Photo-Lithographer, Washington, D. C.

UNITED STATES PATENT OFFICE.

PETER V. STAATS, OF RARITAN, NEW JERSEY, ASSIGNEE, BY MESNE ASSIGNMENTS, OF JOHN G. DUNHAM.

IMPROVEMENT IN MOWING-MACHINES.

Specification forming part of Letters Patent No. 30,961, dated December 18, 1860; reissue No. 2,648, dated June 11, 1867.

DIVISION B.

*To all whom it may concern:*

Be it known that JOHN G. DUNHAM, of Raritan, in the county of Somerset and State of New Jersey, did invent certain new and useful Improvements in Mowing-Machines, of which the following is a full, clear, and exact description, reference being had to the accompanying drawings which make part of this specification, and in which—

Figure 1 represents a plan or top view of a mowing-machine embracing said improvements. Fig. 2 represents a view in elevation of the same, as seen from the rear, the black lines showing the cutting apparatus resting on level ground, while the red dotted lines show its outer or divider end raised by being drawn over a ridge or elevation, and the red full lines show it as lifted and folded against the frame for transportation. Fig. 3 represents a similar view of one of the driving and main gear-wheels, together with one of the spur-wheels on the counter-shaft, as seen from the outer side. Fig. 4 represents a similar view of the stationary metallic axle or journal, which supports the main frame, and upon which the driving-wheels revolve. Fig. 5 represents a similar view of the coupling-arm and sliding socket-piece, by which the finger-beam is attached to the main frame, and raised or lowered thereon. Fig. 6 represents the details of one of the backing-ratchets. Fig. 7 represents a similar view of the divider, grain-wheel, and track-clearer; and Fig. 8 represents the details of the device by which the front end of the drag-bar is connected to the main frame.

The improvement herein claimed consists, first, in combining with a two-wheeled side-draft hinge-joint mowing-machine, an overhanging reel, supported on a single post or standard; second, in combining with a two-wheeled hinge-joint mowing-machine an overhanging reel, having two ribs or beaters only.

In the accompanying drawings, a main frame, A A′, is shown as arranged between two driving-wheels, B, turning loosely on journals C″, on a fixed metallic axle, C, extending across and bolted to the frame. A finger-beam, D, of metal, is secured at its inner end to a shoe, E, which is formed with a wide rear part, in which a conical wheel, E‴, revolves in suitable bearings, to support the heel end of the finger-beam. An ear or lug, *e′*, projects from that side of the shoe E next the main frame, and is pivoted or hinged between lugs cast on the lower end of a coupling-arm, F, the other end of which is hinged to a vertical post, F′, which slides in a vertical groove or recess in a bracket-plate, G, bolted to the inner frame timber. The heel of the finger-beam can be lowered or raised, and held in different positions, relative to the ground, by a nut, *f*, on a bolt sliding in a groove, *f′*, in the bracket G. The outer end of the finger-beam is also supported by a small wheel, I‴. A drag-bar, G‴, connects the shoe E to a bracket, H, on the main frame in front of the inner driving-wheel. This bracket is pivoted at H″ to play vertically, being controlled in its movement by a curved slot, H‴, in the bracket and a set-screw, H⁗, in the frame. A caster-wheel, M, supports the rear end of the frame, and a tongue is hinged to the front of the frame, by which to draw the machine. The cutters are driven by a pitman, J⁗, on a crank-shaft, J‴, to which motion is imparted through bevel pinions J′ J″, on a counter-shaft, J, extending transversely across the frame, and carrying at each end a spur-pinion, B′, driven by a main gear-wheel, B″, and connected to the counter-shaft by suitable backing-ratchets B‴. A standard piece or bracket, K, is mounted on the inner rear corner of the main frame. A reel-post, K′, is pivoted at its foot, so as to allow its upper end to play back and forth, parallel to the bracket, to set the reel forward or back, as required, being held in any desired position by a set-screw, *j*. The reel-shaft L″ turns in bearings in a box, K″, which embraces and slides up and down on the post K′, being held at any desired height by a set-screw.

By these two adjustments it will be seen that the reel can be adjusted either backward or forward or up and down.

The reel is driven by a band, L, which encircles a pulley, L′, on the reel-shaft. The reel shown in the drawing is what is called a "knife-reel,"—that is, it is one which has but two arms, and those are opposite and parallel to each other on their shaft.

The use of a reel with a mowing-machine, under some circumstances, is important, as, for instance, in descending hill sides, when the wind blows in the same direction in which the team is moving, in which event the grass is liable to be blown so that the cutters either slide over it or cut it some distance above the roots. The reel, however, sweeps back such grass against the cutters, and thus insures its being cut, and that, too, in an even manner. The reel also sweeps the cut grass from the finger-beam.

Reels have not heretofore been combined with that class of mowing-machines having a folding finger-beam in an unobjectionable manner, as, owing to their construction, the reel had to be set forward before the cutting apparatus could be folded up, and then set back again for use, thus consuming time.

By combining a knife-reel, as above described, with a mowing-machine having a folding finger-beam, the cutting apparatus can be folded at any time by simply turning the reel into a vertical position, as shown in Fig. 2.

The rotation of the reel can be stopped by throwing off the band L, or by unscrewing the set-screw, which holds the driving-pulley to the shaft J.

The heel of the finger-beam is kept from falling too low down or from swinging under the frame by a projection, *k*, on the under side of brace F, which projection abuts against a shoulder, *k′*, on the piece F.

The finger-beam, when folded up, as shown in full red lines in Fig. 2, is held in that position by a hook, M, the drag-bar G‴ is slightly sprung by the folding of the beam, and thus tends to uphold the coupling-arm F, as shown in Fig. 2.

It is deemed unnecessary here to describe the details of the organized machine, as they form no part of the subject-matter herein claimed, and are described in another application filed simultaneously with this one.

What is claimed herein as the invention of the said JOHN G. DUNHAM is—

1. The combination, with a two-wheeled mowing-machine, having a laterally-projecting cutting apparatus hinged at its inner or heel end only, of an overhanging reel supported upon a single post.

2. The combination, with a two-wheeled mowing-machine, having a hinged finger-beam, of an overhanging reel having two ribs or beaters only, whereby I am enabled to fold the finger-beam up to the main frame without removing the reel.

In testimony whereof I have hereunto subscribed my name.

PETER V. STAATS.

Witnesses:

JEREMIAH WHITENOCK,
SAMUEL GANO, Jr.